United States Patent [19]

Rosenquist

[11] 4,438,255

[45] Mar. 20, 1984

[54] ACYLOXY TERMINATED COPOLYESTER-CARBONATES

[75] Inventor: Niles R. Rosenquist, Evansville, Ind.

[73] Assignee: General Electric Company, Mt. Vernon, Ind.

[21] Appl. No.: 450,810

[22] Filed: Dec. 17, 1982

[51] Int. Cl.³ ............................................ C08G 63/64
[52] U.S. Cl. .................................... 528/176; 528/126; 528/128; 528/173; 528/179; 528/194; 528/196; 528/198
[58] Field of Search ............... 528/126, 128, 173, 176, 528/158, 179, 154

[56] References Cited

U.S. PATENT DOCUMENTS 4,238,597  12/1980  Markezich et al. ................. 528/176
4,255,556   3/1981  Segal et al. ........................... 528/176
4,330,663   5/1982  Rosenquist .......................... 528/176

Primary Examiner—Lester L. Lee
Attorney, Agent, or Firm—Martin B. Barancik

[57] ABSTRACT

There are provided novel copolyester-carbonate resins exhibiting improved thermal resistance which contain aromatic acyloxy terminal groups.

26 Claims, No Drawings

ACYLOXY TERMINATED COPOLYESTER-CARBONATES

BACKGROUND OF THE INVENTION

The importance of chain terminating or end-capping copolyester-carbonates by means of certain molecular weight regulating or chain terminating compounds is well known. Copolyester-carbonates which are not end-capped or chain terminated are generally insufficiently heat stable since the free phenolic end groups provide a reactive site which is detrimental to the stability of the copolyester-carbonate polymer. Furthermore, the absence of a chain terminating or end capping agent or condition during the preparation of the aromatic copolyester-carbonate results in a polymer with a molecular weight which is often so high that the polymer is too viscous to mold at reasonable temperatures.

Standard chain terminating agents employed in the preparation of aromatic copolyester-carbonates include members of the phenol family such as phenol itself and tertiary butyl phenol. While these phenol chain terminating agents are generally effective, there is a need, in certain applications, for copolyester-carbonates exhibiting higher heat resistance, particularly higher heat distortion temperatures, than those exhibited by copolyester-carbonates employing phenols as end capping agents. It is known that replacing these phenol chain terminating agents by other compounds, such as benzoate esters, results in copolyester-carbonates exhibiting improved heat resistance.

However, the area of chain terminators and their effects upon the properties of copolyester-carbonates is generally not completely understood and is one wherein the empirical approach is generally the rule rather than the exception in determining whether a particular compound or class of compounds will function effectively as chain terminators for copolyester-carbonates. Thus, for example, while one particular compound may function effectively as a chain terminator for copolyester-carbonates another similar compound or class of compounds might be ineffective as a chain terminator. This art is further complicated by the fact that not only must a particular compound function as a chain terminating agent, but this compound, when incorporated into the copolyester-carbonate polymer chain as a terminal group, must not adversely affect the positive and advantageous properties of the copolyester-carbonate. Thus, while some compounds may be effective chain terminators they may not be practical since they adversely affect some of the positive and advantageous properties of copolyester-carbonates.

It is, therefore, an object of the instant invention to provide novel chain terminated copolyester-carbonates exhibiting improved heat resistance while simultaneously generally retaining, to a substantial degree, substantially all or most of their other advantageous properties.

SUMMARY OF THE INVENTION

In accordance with the instant invention there is provided a composition comprising an aromatic copolyester-carbonate chain terminated with a residue represented by the general formula

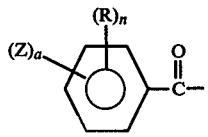

wherein:

each R is independently selected from monovalent hydrocarbon radicals, substituted monovalent hydrocarbon radicals, and halogen radicals;

a represents a whole number having a value of from 1 to 3 inclusive;

n represents a number having a value of from 0 up to the number of replaceable hydrogen atoms present on the ring carbon atoms of the aromatic nucleus; and each Z is independently selected from radicals represented by the general formulae $$R^1-\underset{\underset{O}{\|}}{C}-O- \quad \text{or} \quad R^1-O-\underset{\underset{O}{\|}}{C}-O-$$

wherein $R^1$ is selected from bulky or rigid monovalent hydrocarbon radicals and bulky or rigid substituted monovalent hydrocarbon radicals.

DESCRIPTION OF THE INVENTION

The instant invention is directed to novel high molecular weight aromatic copolyester-carbonate resins having as terminal or end groups particular acyloxy groups. The termination or end-capping of the copolyester-carbonate polymer with these particular groups results in copolyester-carbonates exhibiting controlled molecular weight and improved heat stability.

The copolyester-carbonates of the instant invention are known compounds which are disclosed, inter alia, in U.S. Pat. Nos. 3,169,121; 3,030,331 and 4,156,069, all of which are hereby incorporated herein by reference.

Briefly stated, the high molecular weight aromatic copolyester-carbonates of this invention comprise recurring carbonate groups

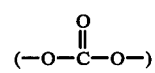

carboxylate groups

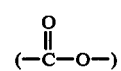

and aromatic carbocylic groups in the linear polymer chain, in which at least some of the carboxylate groups and at least some of the carbonate groups are bonded directly to ring carbon atoms of the aromatic carbocyclic groups.

These copolyester-carbonate polymer contain ester and carbonate linkages in the polymer chain, wherein the amount of ester linkages is in the range of from about 25 to about 90 mole percent, preferably from about 35 to about 80 mole percent relative to the carbonate linkages.

The copolyester-carbonates are in general prepared by coreacting (i) a difunctional carboxylic acid or a reactive derivative thereof, (ii) a dihydric phenol, and (iii) a carbonate precursor.

The dihydric phenols useful in the preparation of the copolyester-carbonates are represented by the general formula

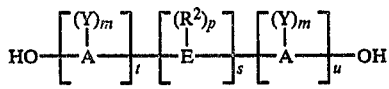
I.

in which A is an aromatic group such as phenylene, biphenylene, naphthylene, anthrylene, etc. E may be an alkylene or alkylidene group such as methylene, ethylene, propylene, propylidene, isopropylidene, butylene, butylidene, isobutylidene, amylene, isoamylene, amylidene, isoamylidene, etc. Where E is an alkylene or alkylidene group, it may also consist of two or more alkylene or alkylidene groups connected by a non-alkylene or non-alkylidene group such as an aromatic linkage, a tertiary amino linkage, an ether linkage, a carbonyl linkage, a silicon-containing linkage, or by a sulfur-containing linkage such as a sulfide, sulfoxide, sulfone, etc. In addition E may be a cycloaliphatic group such as a cyclopentyl, cyclohexyl, cyclohexylidene, and the like; a sulfur containing linkage such as sulfide, sulfoxide, or sulfone; an ether linkage; a carbonyl group; a tertiary nitrogen group; or a silicon-containing linkage such as silane or siloxy. $R^2$ is selected from hydrogen or a monovalent hydrocarbon group such as alkyl (methyl, ethyl, propyl, etc.), aryl (phenyl, naphthyl, etc.), aralkyl and alkaryl (benzyl, ethylphenyl, etc.), and cycloaliphatic (cyclopentyl, cyclohexyl, etc.). Y may be an inorganic atom such as chlorine, bromine, etc.; an inorganic group such as the nitro group; an organic group such as $R^2$ above; or an oxy group such as $OR^2$, it being only necessary that Y be inert to an unaffected by the reactants and the reaction conditions. The letter m is any whole number from and including zero through the number of positions on A available for substitution; p is any whole number from and including zero through the number of positions on E available for substitution; t is a whole number equal to at least one; s is either zero or one; and u is any whole number including zero.

In the dihydric phenol compound represented by Formula I above, when more than one Y substituent is present, they may be the same or different. The same is true for the $R^2$ substituent. Where s is zero in Formula I and u is not zero, the aromatic rings are directly joined with no intervening alkylene or other bridge. The positions of the hydroxyl groups and Y on the aromatic nuclear residues can be varied in the ortho, meta, or para positions and the groupings can be in a vicinal, asymmetrical or symmetrical relationship, where two or more ring carbon atoms of the aromatic hydrocarbon residue are substituted with Y and hydroxyl group.

Examples of the dihydric phenol compounds that may be employed in this invention, and which are represented by Formula I, include, but are not limited to:
2,2-bis(4-hydroxyphenyl)propane (bisphenol-A);
2,4'-dihydroxydiphenylmethane;
bis(2-hydroxyphenyl)methane;
bis(4-hydroxyphenyl)methane;
bis(4-hydroxy-5-nitrophenyl)methane;
bis(4-hydroxy-2,6-dimethyl-3-methoxyphenyl)methane;
1,1-bis(4-hydroxyphenyl)ethane;
1,2-bis(4-hydroxyphenyl)ethane;
1,1-bis(4-hydroxy-2-chlorophenyl)ethane;
1,1-bis(2,5-dimethyl-4-hydroxyphenyl)ethane;
1,3-bis(3-methyl-4-hydroxyphenyl)propane;
2,2-bis(3-isopropyl-4-hydroxyphenyl)propane;
bis(4-hydroxyphenyl)phenylmethane;
1,1-bis(4-hydroxyphenyl)cyclohexane; and the like.

Other useful dihydric phenols are disclosed in U.S. Pat. Nos. 3,169,121; 2,288,282; 3,148,172 and 2,739,171, all of which are incorporated herein by reference.

Preferred phenols are those wherein E is an alkylene, alkylidene, cycloalkylene, or cycloalkylidene group, A is a phenyl group, s is one, u is one, and t is one.

In general, any difunctional carboxylic acid conventionally used in the preparation of linear polyesters may be utilized in the preparation of the copolyester-carbonates of the instant invention. In general, the carboxylic acids which may be used include the aliphatic carboxylic acids, the aliphatic-aromatic carboxylic acids, and the aromatic carboxylic acids. These acids are disclosed in U.S. Pat. No. 3,169,121.

The difunctional carboxylic acids which may be utilized in the preparation of the copolyester-carbonates will in general conform to the formula

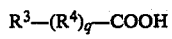
II.

wherein $R^4$ is an alkylene, alkylidene, aralkylene, aralkylidene or cycloaliphatic group; an alkylene, alkylidene or cycloaliphatic group containing ethylenic unsaturation; an aromatic group such as phenylene, biphenylene, and the like; two or more aromatic groups connected through non-aromatic linkages such as alkylene or alkylidene groups; and the like. $R^3$ is either a carboxyl or a hydroxyl group. The letter q represents one where $R^4$ is a hydroxyl group and either zero or one where $R^3$ is a carboxyl group.

Preferred difunctional carboxylic acids are the aromatic carboxylic acids, i.e., those acids of Formula II wherein q is one, $R^3$ is a carboxyl or hydroxyl group, and $R^4$ is an aromatic group such as phenylene, naphthylene, biphenylene, and the like. The preferred aromatic carboxylic acids are those represented by the general formula

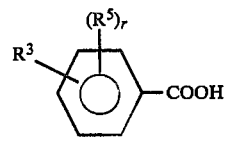
III.

wherein:
$R^3$ is as defined above;
$R^5$ is independently selected from inorganic atoms such as halogens, inorganic groups such as the nitro group, amine group, and the like, a monovalent organic group such as alkyl, aryl, alkaryl, cycloaliphatic, and a hydrocarbonoxy group such as alkoxy or aryloxy; and
r represents a whole number having a value of from 0 to 4 inclusive.

When more than one $R^5$ substituent is present they may be the same or different.

Mixtures of these difunctional carboxylic acids may also be employed, and where the term difunctional carboxylic acid is used herein mixtures of two or more different difunctional carboxylic acids as well as individual difunctional carboxylic acids are considered to be included therein.

Preferred aromatic difunctional carboxylic acids are isophthalic acid, terephthalic acid, and mixtures thereof. A particularly useful mixture of isophthalic acid and terephthalic acid is one wherein the weight ratio of isophthalic acid to terephthalic acid is in the range of from about 1:10 to about 10:1.

Rather than utilizing the difunctional carboxylic acids per se it is possible, and sometimes even preferred, to employ their reactive derivatives. The preferred reactive derivatives of the difunctional carboxylic acids are the acid halides. Preferred acid halides are the acid dichlorides. Thus, for example, instead of using isophthalic acid or terephthalic acid it is possible to use isophthaloyl dichloride or terephthaloyl dichloride.

The carbonate precursor employed in the preparation of the copolyester-carbonates can be a carbonyl halide, a diaryl carbonate, or a bishaloformate. The preferred carbonate precursors are the carbonyl halides. The carbonyl halides include carbonyl chloride, carbonyl bromide, and mixtures thereof. The preferred carbonyl halide is carbonyl chloride, also known as phosgene.

The copolyester-carbonates may be prepared by any of the usual well known procedures. One of these procedures is the interfacial polymerization process.

The copolyester-carbonate polymers of the instant invention are end capped or chain terminated with at least one residue represented by the general formula

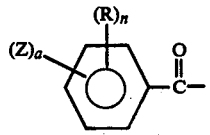 IV.

wherein:

each R is independently selected from monovalent hydrocarbon radicals, substituted monovalent hydrocarbon radicals, and halogen radicals;

a represents a whole number having a value of from 1 to 3 inclusive;

n represents a number having a value of from 0 up to and including the number of replaceable hydrogen atoms present on the ring carbon atoms of the aromatic nuclear residue; and each Z is independently selected from radicals represented by the general formulae

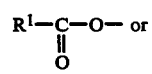 V.

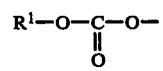 VI.

wherein $R^1$ is selected from bulky or rigid monovalent hydrocarbon radicals and bulky or rigid substituted monovalent hydrocarbon radicals.

The monovalent hydrocarbon radicals represented by R are selected from alkyl radicals, both straight chain and branched, aryl radicals, alkaryl radicals, and aralkyl radicals. The preferred alkyl radicals are those containing from 1 to about 6 carbon atoms and include, for example, methyl, ethyl, propyl, isopropyl, butyl, and the like. The preferred aryl radicals are those containing from 6 to 12 carbon atoms and include phenyl, naphthyl, and biphenyl. The preferred alkaryl and aralkyl radicals are those containing from 7 to about 14 carbon atoms.

The substituted monovalent hydrocarbon radicals represented by R are those monovalent hydrocarbon radicals described supra which have at least one hydrogen atom replaced by an inorganic atom or group, or an inorganic atom containing radical, for example chlorine or bromine, a nitro group, or a —$OR^6$ wherein $R^6$ is a monovalent hydrocarbon radical such as an alkyl or an aryl radical. Thus, the substituted monovalent hydrocarbon radicals represented by R are selected from substituted alkyl radicals, substituted aryl radicals, substituted aralkyl radicals, and substituted alkaryl radicals. Some illustrative non-limiting examples of these substituted monovalent hydrocarbon radicals include, but are not limited to, methoxy, propoxy, phenoxy, chlorobutyl, chloropropyl, dichloropropyl, dibromophenyl, nitrophenyl, and the like.

The preferred halogen radicals represented by R are chlorine and bromine.

When more than one R substituent is present on the ring carbon atoms of the aromatic hydrocarbon residue they may be the same or different.

Preferred residues of Formula IV are those wherein n is zero.

The bulky or rigid monovalent hydrocarbon radicals represented by $R^1$ are selected from branched alkyl radicals, cycloalkyl radicals, alkyl substituted cycloalkyl radicals, and the aryl radicals. The preferred branched alkyl radicals are those containing from 3 to about 8 carbon atoms and include, for example, isopropyl, tertiarybutyl, isobutyl, neopentyl, 2,3-dimethylpropyl, isohexyl, and the like. The preferred cycloalkyl radicals are those containing from 4 to about 7 ring carbon atoms. The preferred alkyl substituted cycloalkyl radicals are those containing from 4 to about 7 ring carbon atoms wherein from 1 to about 3 of the hydrogen atoms of the ring carbon atoms have been replaced with lower alkyl groups, preferably those containing from 1 to about 4 carbon atoms. Some illustrative non-limiting examples of the cycloalkyl radicals and the alkyl substituted cycloalkyl radicals are cyclopropyl, cyclopentyl, cyclohexyl, methylcyclohexyl, ethylcyclohexyl, and the like.

The preferred aryl radicals represented by $R^1$ are those containing from 6 to about 20 carbon atoms. These include, but are not limited to, phenyl, naphthyl, biphenyl, and the like. The more preferred aryl radicals are those represented by the general formula

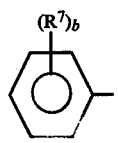 VII.

wherein:

each $R^7$ is independently selected from alkyl radicals, aryl radicals, alkaryl radicals, and aralkyl radicals; and b is a whole number having a value of from 0 to 5 inclusive.

Preferred alkyl radicals represented by $R^7$ are the branched alkyl radicals containing from 1 to about 6 carbon atoms. The preferred aryl radicals represented by $R^7$ are those containing from 6 to 12 carbon atoms and include phenyl, naphthyl and biphenyl.

The preferred alkaryl and aralkyl radicals represented by $R^7$ are those containing from 7 to about 14 carbon atoms and include benzyl, ethylphenyl, phenylpropyl, and the like.

When more than one R⁷ substituent is present they may be the same or different.

The bulky or rigid substituted monovalent hydrocarbon radicals represented by R¹ are those monovalent hydrocarbon radicals described hereinafore wherein at least one hydrogen atom of the monovalent hydrocarbon radical has been replaced with an inorganic atom or group such as a halogen, a nitro group, an amine group, and the like. Thus, the bulky or rigid substituted monovalent hydrocarbon radicals represented by R¹ are selected from substituted branched alkyl radicals, substituted cycloalkyl radicals, substituted alkyl substituted cycloalkyl radicals, and substituted aryl radicals.

The preferred substituted branched alkyl radicals are those containing from 3 to about 8 carbon atoms and from 1 to 3 substituent groups.

The preferred substituted cycloalkyl radicals are those containing from 4 to 7 ring carbon atoms wherein from 1 to about 3 of the ring carbon hydrogen atoms have been replaced with substituent groups.

The preferred substituted alkyl substituted cycloalkyl radicals are those containing from 4 to about 7 ring carbon atoms and from 1 to about 3 alkyl groups on the ring carbon atoms, wherein from 1 to about 3 of the hydrogen atoms of the ring carbon atoms have been replaced with substituent groups.

The preferred substituted aryl radicals are those containing from 6 to about 20 carbon atoms wherein from 1 to about 3 of the ring carbon hydrogen atoms have been replaced with substituent groups.

The preferred radicals of Formulae V and VI are those wherein R¹ is selected from bulky or rigid monovalent hydrocarbon radicals.

The more preferred radicals of Formula V are those wherein R¹ is selected from radicals represented by Formula VII. That is to say, the preferred radicals of Formula V are those represented by the general formula

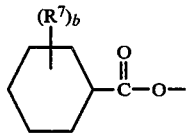   VIII.

wherein R⁷ and b are as defined hereinafore.

The more preferred radicals of Formula VI are those wherein R¹ is selected from radicals represented by Formula VII. That is to say, the preferred radicals of Formula VI are those represented by the general formula

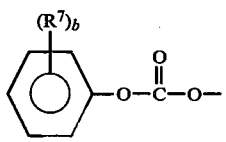   IX.

wherein R⁷ and b are as defined hereinafore.

The preferred radicals of Formula VIII are those wherein R⁷ is an alkyl group, preferably a branched alkyl group, and b is one.

The preferred residues of Formula IV are those wherein Z is selected from radicals of Formula VIII or radicals of Formula IX. The more preferred residues of Formula IV are those wherein Z is selected from radicals of Formulae VIII or IX and wherein a is 2.

The residues of Formula IV can be derived from various corresponding compounds. It is preferred to utilize compounds represented by the general formula

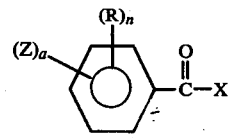   X.

wherein R, Z, n, and a are as defined hereinafore; and X is selected from the chlorine radical, the bromine radical, the hydroxyl radical, and the

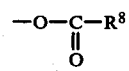

radical wherein R⁸ represents a lower alkyl radical containing from 1 to about 4 carbon atoms.

Some nonlimiting illustrative examples of compounds falling within the scope of Formula X include:

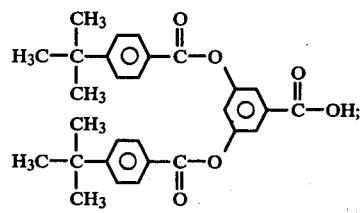

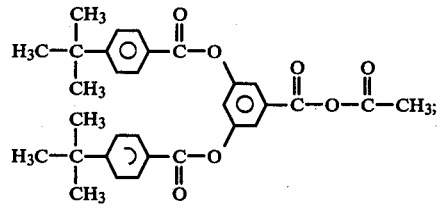

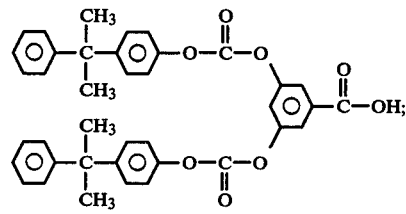

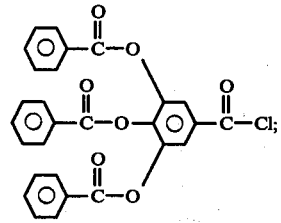

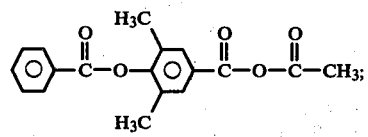

-continued

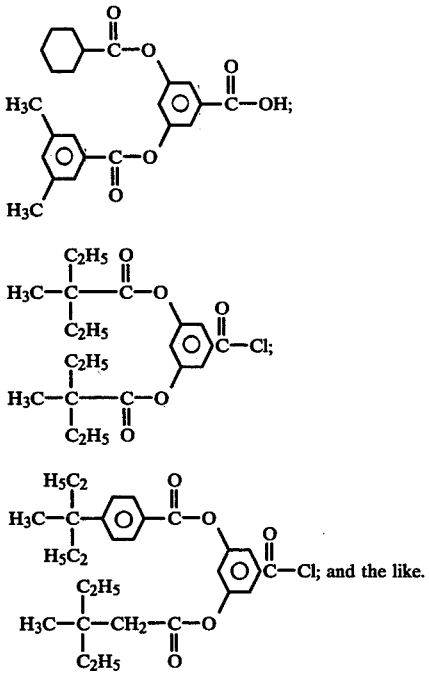

The compounds of Formula X function as encapping or chain terminating agents serving to control or regulate the molecular weight of the copolyester-carbonate polymers in the process of the instant invention. The chain terminating agents react with the hydroxyl groups of the bisphenols thereby forming an ester bond and resultant terminal groups represented by the formula

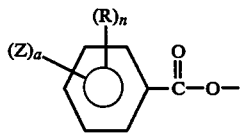 XI.

wherein R, Z, n, and a are as defined hereinafore. The compounds of Formula X are added to the copolyester-carbonate formation reaction process so that their presence can influence the chain length and, therefore, the molecular weight of the copolyester-carbonate resin, as well as merely react with the phenol end group.

The weight average molecular weight of the copolyester-carbonate is generally controlled, by the use of compound of Formula X, in the range of from about 5,000 to about 200,000, preferably from about 10,000 to about 100,000, and more preferably from about 20,000 to about 50,000. The molecular weight is generally dependent upon the amount of the compound of Formula X employed or present during the copolyester-carbonate formation reaction. Generally, the greater the amount of the compound of Formula X present, the lower the molecular weight. Conversely, the smaller the amount of the compound of Formula X employed the larger the molecular weight of the copolyester-carbonate.

The quantity of the chain terminating agent of Formula X which is employed is a chain terminating amount. By chain terminating amount is meant an amount effective to prepare an aromatic copolyester-carbonate resin having a conventional molecular weight. That is to say, a molecular weight sufficiently high for the copolyester-carbonate resin to exhibit the positive and advantageous properties but insufficiently high for the polymer to become too viscous for any practical application. Generally, this amount ranges from about 0.5 to about 15 mole percent, based on the amount of the dihydric phenol employed in the reaction, preferably from about 1 to about 10 mole percent, and more preferably from about 3 to about 7 mole percent.

In practicing the present invention only one compound of Formula X may be employed, in which case all or substantially most of the end or terminal groups will be the same; or two or more different compounds of Formula X may be used, in which case the copolyester-carbonate polymers will contain a mixture of different terminal groups depending on the number and amounts of the different compounds of Formula X utilized. Additionally, the compounds of Formula X may be used in conjunction with known phenol or other chain terminators. In such instances the polymers will contain a mixture of of terminal groups formed from the respective chain terminating compounds.

One of the methods for preparing the copolyester-carbonate resins of the instant invention, when employing phosgene as the carbonate precursor, and the diacid chlorides as the reactive derivatives of the difunctional carboxylic acids, involves introducing the diacid chloride, dissolved in a suitable solvent, into a reaction mixture containing a dihydric phenol, an acid acceptor, a catalyst, a water immiscible organic solvent such as methylene chloride, water, and at least one compound represented by Formula X. Upon completion of the introduction of the diacid chloride, phosgene is introduced into the reaction mixture in sufficient quantities to bring about the reaction of substantially all of the remaining aromatic hydroxy groups.

The compounds of Formula X may be present in the reaction mixture before the introduction of the diacid chlorides has begun; they may be added to the reaction mixture after the diacid chlorides have been added; or the addition of the diacid chlorides and at least one compound of Formula X into the reaction mixture may take place simultaneously.

The compositions of the instant invention may optionally contain admixed therewith the commonly known and used additives such as, for example, antioxidants; hydrolytic stabilizers such as epoxides; ultraviolet radiation absorbers such as the benzophenones, benzotriazoles, and cyanoacrylates; impact modifiers; fillers such as glass fibers, talc, mica, clay, and the like; color stabilizers such as the organophosphites; and flame retardants.

Some useful flame retardants are those disclosed in U.S. Pat. Nos. 3,915,926 and 4,197,232; and the organic alkali metal salts and organic alkaline earth metal salts of sulfonic acids as disclosed in U.S. Pat. Nos. 3,933,734; 3,948,851; 3,926,968; 3,919,167; 3,909,490; 3,953,396; 3,931,100; 3,978,024; 3,953,399; 3,917,559; 3,951,910 and 3,940,366, all of which are hereby incorporated herein by reference.

DESCRIPTION OF THE PREFERRED EMBODIMENT

The following examples are set forth to further illustrate the present invention and are not to be construed as limiting the invention thereto. Unless otherwise specified, where parts or percentages are mentioned, they are parts or percentages by weight.

EXAMPLE 1

This example illustrates the preparation of an end-capping compound of Formula X. More specifically, this example illustrates the preparation of an end-capping compound represented by the formula

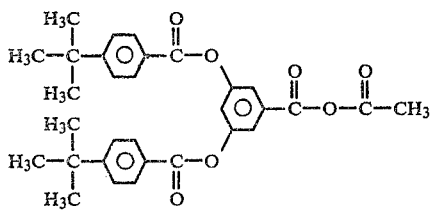

XII.

In a 300 ml three neck flask fitted with two dropping funnels and a drying tube and containing a stir bar were mixed 15.4 grams (0.1 mole) of 3,5-dihydroxybenzoic acid, 100 ml methylene chloride (dried over a 4 Å molecular seives) and 14 ml (0.1 mole) of triethylamine (dried over 4 Å molecular seives). To this slurry was added dropwise over 10 minutes 8.2 grams (0.105 mole) acetyl chloride. After about 10 minutes additional stirring, the reaction mixture became a nearly clear solution. An additional 28 ml (0.2 mole) triethylamine was added. Then 42.4 grams (0.22 mole) tertiary butyl benzoyl chloride was added dropwise over 20 minutes. A precipitate (triethylamine hydrochloride) formed. After 45 minutes additional stirring, the reaction mixture was filtered, the solid washed several times with methylene chloride and the solvent removed from the methylene chloride soluble portion to yield a brown, semisolid paste.

This procedure was repeated on a three times scale and the product purified by redissolving it in 500 ml of methylene chloride, washing that solution twice with 200 ml of water, drying the methylene chloride solution over anhydrous calcium sulfate, removing the solvent under vacuum (to yield a thick oily paste), dissolving the paste in 100 ml of boiling toluene, and cooling. The product crystalized and was collected by vacuum filtration and washed with about 10 ml of toluene to yield a nearly white powder [mp 192° to 195.5° C.; ir 1795 cm$^{-1}$, 1750 cm$^{-1}$, 1730 cm$^{-1}$; pmr δ 1.4 (2 peaks with 1.5 Hz separation, 21H), δ 7.4 to δ 7.6 (multiplet, 5H), δ 7.9 to δ 8.3 (multiplet, 6H)].

EXAMPLE 2

This example illustrates the preparation of an end-capping agent represented by the formula

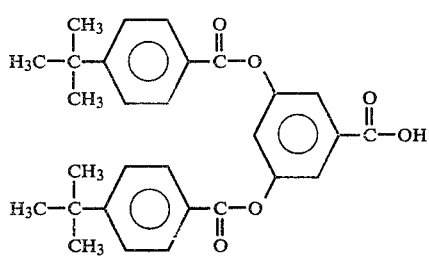

XIII.

The compound of Example 1 (0.0285 mole, 14.7 grams) and water (0.0305 mole, 0.55 ml) were dissolved in 55 ml of dimethylformamide (dried over 4 Å molecular seives) and the solution was heated for 2 hours at 116° to 125° C. in a tightly capped flask. The solution was then cooled and diluted to 250 ml with water. The reaction product separated from the water layer as a white oil. The water layer was decanted off and the oil placed under vacuum (1.0 mm) to remove volatiles. The product was then washed with an additional 25 ml of water to yield a white solid. Recrystallization from 15 ml toluene yielded 7.7 grams of a white powder [ir 1735 cm$^{-1}$, 1685 cm$^{-1}$; pmr δ 1.36 (singlet, 18H), δ 7.3 to δ 8.25 (multiplet 11H), δ 11.28 (singlet, 1H)].

PREPARATION OF CHAIN TERMINATED COPOLYESTER-CARBONATE

General scheme for the preparation of chain terminated copolyester-carbonate resin wherein bisphenol-A is employed as the dihydric phenol, phosgene as the carbonate precursor, and a mixture of isophthaloyl dichloride and terephthaloyl dichloride as the reactive derivatives of the difunctional carboxylic acid.

A 1000 ml four neck flask is fitted with a mechanical stirrer, a pH probe, a gas inlet tube, and a Claisen adapter to which is attached a dry ice condenser and an aqueous caustic inlet tube. To the flask are added 280 ml of water, 340 ml of methylene chloride, 1.4 ml of triethylamine (0.01 mole), 28.5 grams (0.125 mole) bisphenol-A, and the particular amount of the particular end-capping agent (as set forth in Table I). With stirring the pH is raised to 9 by the addition of 25% aqueous sodium hydroxide. A solution (36% solids) in methylene chloride of 15.8 grams (0.078 mole) of a mixture of 85% terephthaloyl dichloride and 15% isophthaloyl dichloride is then added over a 15 minute period with the pH maintained at 9-10. The addition funnel is then replaced with a phosgene inlet tube and phosgene is then introduced into the flask at 0.5 gram per minute for 15 minutes (7.5 grams, 0.076 mole) with the pH maintained at 10 to 11. The resin layer is separated from the brine layer, is washed once with 300 ml of 3 weight percent aqueous hydrochloric acid and twice with 300 ml of distilled water. The resin is then precipitated in a Waring blender into 1500 ml methanol, the resin powder is collected, washed with about 500 ml of additional methanol, allowed to dry at room temperature.

Using this procedure various chain terminated copolyester-carbonate resins were prepared utilizing varying amounts of different chain terminating or end-capping agents as set forth in Table I. The IV (intrinsic viscosity) and Tg (glass transition temperature) in °C. are reported in Table I for each of these copolyester-carbonate resins.

TABLE I

| Example No. | Chain Terminator | Amount of Chain Terminator | Mole % Chain Terminator | IV (dl/gm) | Tg (°C.) |
|---|---|---|---|---|---|
| 3 | phenol | 0.61 gm. | 5.2 | 0.496 | 182.4 |
| 4 | t-butyl phenol | 0.98 gm. | 5.2 | 0.450 | 186.8 |
| 5 | cmpd. XIII | 3.1 gms | 5.2 | 0.412 | 187.4 |
| 6 | cmpd. XIII | 2.7 gms. | 4.6 | 0.457 | 189.6 |

In Table I Examples 3 and 4, i.e., the phenol and t-butyl phenol endcapped copolyester-carbonates, are copolyester-carbonates falling within the prior art and outside the scope of the instant invention. They are presented for comparative purposes. Examples 5 and 6 illustrate copolyester-carbonates of the instant invention which are end-capped with the end-capping compounds of the instant invention. As can be seen from the data in Table I the copolyester-carbonates of the instant invention exhibit higher glass transition temperatures (Tg) than the phenol and t-butyl phenol endcapped copolyester-carbonates. Thus the instant copolyester-carbonate resins exhibit improved heat resistance than do the conventional prior art copolyester-carbonate resins.

It is interesting to note that the copolyester-carbonate resin of Example 5 has a higher Tg than the copolyester-carbonate of Example 4 even though the t-butyl phenol end-capped copolyester-carbonate resin has a higher intrinsic viscosity than the copolyester-carbonate of Example 5. Generally, the glass transition temperatures are somewhat related to the IV of a copolyester-carbonate resin. That is to say, generally the higher the IV of a copolyester-carbonate the higher the Tg relative to the same copolyester-carbonate resin having a lower IV. Yet even though the copolyester-carbonate resin of Example 5 has a lower IV than the copolyester-carbonate resin of Example 4 it nevertheless has a higher Tg. Comparing the copolyester-carbonate resin of Example 4 with the copolyester-carbonate resin of Example 6 it is clear that the instant copolyester-carbonate resins exhibit a much improved Tg compared to prior art copolyester-carbonate resins of substantially equivalent intrinsic viscosities.

This higher heat resistance, as evidenced by the higher glass transition temperatures, is of considerable importance. One of the main arguments for using co-polyester carbonate resins in place of polycarbonate resins in certain applications is that the copolyester-carbonate resins have a higher heat resistance than do polycarbonate resins. Thus, in applications requiring a material having a high heat resistance the copolyester-carbonates are usually preferred over polycarbonate resins even though the processability of these copolyester-carbonates is inferior to that of the polycarbonates.

In the preparation of polycarbonates the usual end-capping agent is phenol. This is generally due to the fact that phenol is readily available, is relatively inexpensive, and results in a polycarbonate resin having adequate properties for most commercial and industrial applications. The standard end-capping agent used in the preparation of copolyester-carbonate resins is t-butyl phenol. This is due to the fact that copolyester-carbonate resins wherein t-butyl phenol is used as the chain terminator have higher heater resistance than copolyester-carbonate resins wherein phenol is utilized as the chain terminating agent. Thus, it can be readily appreciated that any further improvement in the heat resistance of the copolyester-carbonates, especially if it can be obtained without serious or significant impairment, to any substantial degree, of any or most of the other advantageous properties of the copolyester-carbonate resins, is of great utility and a major improvement in the resin.

It will thus be seen that the objects set forth above, among those made apparent from the preceding description are efficiently attained, and since certain changes may be made in carrying out the above process and the compositions set forth without departing from the scope of the invention, it is intended that all matters contained in the above description shall be interpreted as illustrative and not in a limiting sense.

What is claimed is:
1. A composition comprising an aromatic copolyester-carbonate chain terminated with at least one residue represented by the general formula

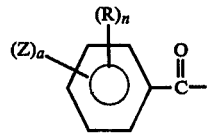

wherein:
each R is independently selected from monovalent hydrocarbon radicals, substituted monovalent hydrocarbon radicals wherein at least one replaceable hydrogen atom of said monovalent hydrocarbon radicals has been replaced with an inorganic atom or group, and halogen radicals;
a represents a whole number having a value of from 1 to 3 inclusive;
n represents a whole number having a value of from 0 up to and including the number of replaceable hydrogen atoms present on the ring carbon atoms of the aromatic nuclear residue; and
Z is independently selected from radicals represented by the general formula

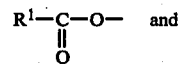

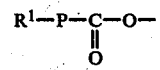

wherein $R^1$ is selected from bulky or rigid monovalent hydrocarbon radicals selected from branched alkyl radicals, cycloalkyl radicals, alkyl substituted cycloalkyl radicals, aryl radicals, aralkyl radicals, and alkaryl radicals, and bulky or rigid substituted hydrocarbon radicals selected from branched alkyl radicals, cycloalkyl radicals, alkyl substituted cycloalkyl radicals, aryl radicals, aralkyl radicals, and alkaryl radicals.

2. The composition of claim 1 wherein said monovalent hydrocarbon radicals represented by R are selected from alkyl radicals, aryl radicals, aralkyl radicals, and alkaryl radicals.

3. The composition of claim 1 wherein said substituted monovalent hydrocarbon radicals represented by R are selected from substituted alkyl radicals, substituted aryl radicals, substituted aralkyl radicals, and substituted alkaryl radicals.

4. The composition of claim 1 wherein said halogen radicals represented by R are selected from chlorine and bromine.

5. The composition of claim 1 wherein n is zero.

6. The composition of claim 1 wherein said branched alkyl radicals contain from 3 to about 8 carbon atoms.

7. The composition of claim 1 wherein said cycloalkyl radicals contain from 4 to about 7 ring carbon atoms.

8. The composition of claim 1 wherein said alkyl substituted cycloalkyl radicals contain from 4 to about 7 ring carbon atoms and from 1 to about 3 substituent alkyl groups on the ring carbon atoms.

9. The composition of claim 1 wherein said aryl radicals are represented by the general formula

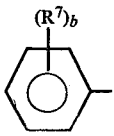

wherein:
each $R^7$ is independently selected from alkyl radicals, aryl radicals, aralkyl radicals, and alkaryl radicals; and b represents a whole number having a value of from 0 to 5 inclusive.

10. The composition of claim 9 wherein said alkyl radicals are selected from branched alkyl radicals.

11. The composition of claim 10 wherein b is one and n is zero.

12. The composition of claim 11 wherein a is two.

13. The composition of claim 1 wherein Z is independently selected from radicals represented by the general formula

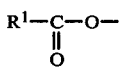

wherein $R^1$ is selected from bulky or rigid monovalent hydrocarbon radicals and substituted bulky or rigid monovalent hydrocarbon radicals.

14. The composition of claim 13 wherein $R^1$ is selected from bulky or rigid monovalent hydrocarbon radicals.

15. The composition of claim 14 wherein said bulky or rigid monovalent hydrocarbon radicals are selected from aryl radicals.

16. The composition of claim 15 wherein said aryl radicals are represented by the general formula

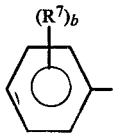

wherein:

each $R^7$ is independently selected from alkyl radicals, aryl radicals, aralkyl radicals, and alkaryl radicals.

17. The composition of claim 16 wherein $R^7$ is selected from alkyl radicals.

18. The composition of claim 17 wherein said alkyl radicals are branched alkyl radicals.

19. The composition of claim 18 wherein b is one.

20. The composition of claim 19 wherein n is zero.

21. The composition of claim 10 wherein said copolyester-carbonate is obtained by the coreaction of bisphenol-A, a carbonate precursor, and at least one difunctional carboxylic acid or a reactive derivative thereof.

22. The composition of claim 21 wherein said carbonate precursor is phosgene.

23. The composition of claim 22 wherein said reactive derivative of said difunctional carboxylic acid is selected from terephthaloyl dichloride, isophthaloyl dichloride, and mixtures thereof.

24. The composition of claim 23 wherein said derivative of said difunctional carboxylic acid is comprised of a mixture of terephthaloyl dichloride and isophthalaoyl dichloride.

25. The composition of claim 24 wherein said residue is represented by the formula

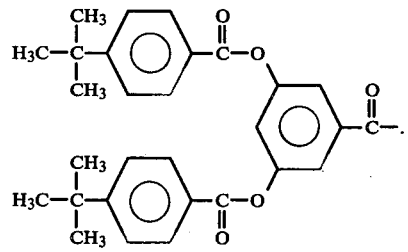

26. The composition of claim 1 wherein said aromatic copolyester-carbonate is chain terminated with two residues represented by the general formula

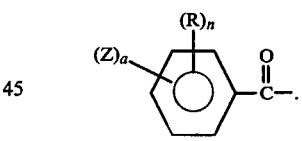

* * * * *

UNITED STATES PATENT AND TRADEMARK OFFICE
CERTIFICATE OF CORRECTION

PATENT NO. : 4,438,255

DATED : March 20, 1984

INVENTOR(S) : Niles R. Rosenquist

It is certified that error appears in the above-identified patent and that said Letters Patent is hereby corrected as shown below:

Column 14, line 42 - "alkaryl radicals."

should be

- "alkaryl radicals wherein at least one replaceable hydrogen atom of said radicals has been replaced with an inorganic atom or group."

Signed and Sealed this

Twelfth Day of August 1986

[SEAL]

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,438,255

DATED : March 20, 1984

INVENTOR(S) : Niles Richard Rosenquist

It is certified that error appears in the above-identified patent and that said Letters Patent is hereby corrected as shown below:

Column 14,
Line 30
Delete "P" and add "O"

Signed and Sealed this

Seventh Day of January, 1992

Attest:

HARRY F. MANBECK, JR.

*Attesting Officer*     *Commissioner of Patents and Trademarks*